United States Patent [19]
Sakaguchi

[11] 3,899,736
[45] Aug. 12, 1975

[54] VIBRATION-RESISTANT DEVICE FOR TAUT BAND SUSPENSION TYPE INDICATING INSTRUMENT

[75] Inventor: Takehiko Sakaguchi, Sakaki, Japan

[73] Assignee: Hioki Electric Works Co., Ltd., Sakaki, Japan

[22] Filed: Dec. 5, 1973

[21] Appl. No.: 421,868

[30] Foreign Application Priority Data
Dec. 5, 1972   Japan............................ 47-121840

[52] U.S. Cl............................ 324/154 R; 324/125
[51] Int. Cl.² ... G01R 5/10; G01R 5/02; G01R 1/14
[58] Field of Search............................ 324/154, 125

[56] References Cited
UNITED STATES PATENTS
3,439,273   4/1969   Sills................................ 324/125

FOREIGN PATENTS OR APPLICATIONS
676,657   5/1939   Germany ............................ 324/125

Primary Examiner—Gerard R. Strecker
Attorney, Agent, or Firm—Browdy and Neimark

[57] ABSTRACT

A vibration-resistant device for electrical indicating instruments of the type comprising a magnet, a moving coil, and a taut metal band which serves as the rotating axis of the moving coil located in the magnetic field of the magnet, the taut metal band being suspended between support members. The vibration-resistant device consists essentially of moving coil displacement preventive rings disposed concentrically with the rotating axis on both sides of the moving coil, and moving coil displacement preventive cylinders equipped inside the casing of the meter movement, opposite to each other and closely adjacent to the moving coil displacement preventive rings on both sides.

1 Claim, 7 Drawing Figures

VIBRATION-RESISTANT DEVICE FOR TAUT BAND SUSPENSION TYPE INDICATING INSTRUMENT

BACKGROUND OF THE INVENTION

1. Field of the Invention

The present invention relates to taut band suspension type indicating instruments, and more particularly to vibration-resistant devices for preventing the taut band from being cut or broken due to external mechanical shock or vibration.

2. Description of the Prior Art

The taut band suspension type indicating meter such as for electrical measurements, e.g., direct current indicating meters, involves a serious drawback — the displacement of the meter movement due to external mechanical shock or vibration, which can often be sufficient to cut the taut band. To avoid this problem, there must be limitation on the displacement of the meter movement. For this purpose, in the prior art, an arrangement has been made as schematically shown in FIG. 7 wherein a moving coil c is mounted on a magnet or a core b in a frame a which is constructed integral with a yoke, a taut band e is fitted to the moving coil by way of a boss d and then extended through a cylindrical stopper f at both ends, which is coupled to the frame on both sides; the taut band is soldered h to a leaf spring g, leaving a small gap G between the stopper f and the boss d; and thus the displacement of the meter movement is limited within the range of the gap. In this structure, however, there have been difficulties in assembling meter elements into position because the assembly process has required a very thin taut band to pass through a narrow stopper f which limits the displacement of the moving element unit. Apparently, the smaller the size of the instrument, the more complicated is the assembly process, and the narrower is the freedom of designing the meter components.

SUMMARY OF THE INVENTION

An object of the invention is to overcome the defects of the prior art, such as indicated above.

Another object is to provide for improved meters which use a taut metal band as a rotating axis, Another object of the invention is to provide a vibration-resistant device capable of preventing the movingelement assembly from being displaced inside the casing, without depending on the principle of the conventional displacement-preventive stopper.

According to the invention, a set of components corresponding to the conventional stopper are associated with the meter casing, thereby simplifying the process of meter element assembly and at the same time preventing the encased meter movement from being displaced.

The other objects, features and advantages of the instant invention will be pointed out in, or apparent from, the detailed description of an embodiment set forth hereinbelow, considered together with the drawing wherein:

DESCRIPTION OF THE PREFERRED EMBODIMENT

Figure 1:
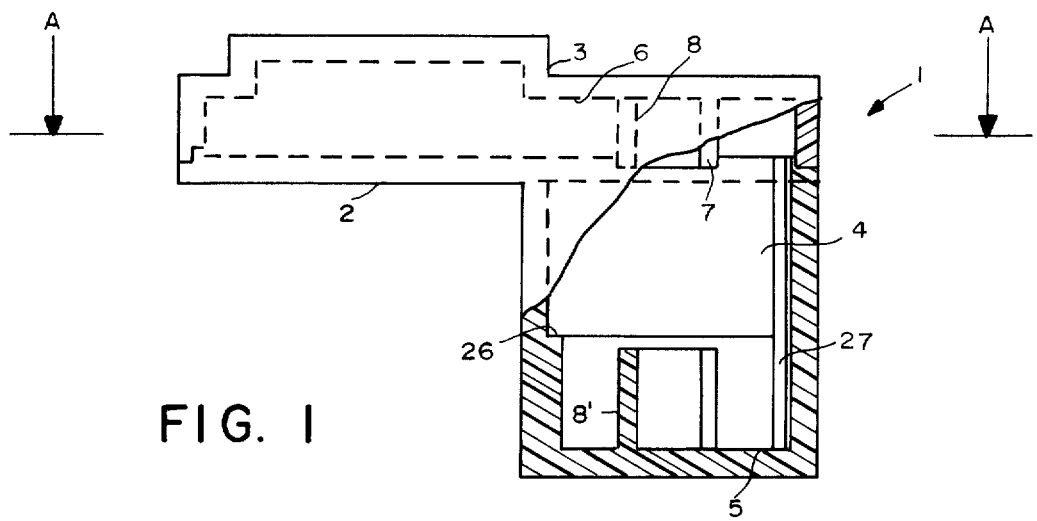
FIG. 1 is an elevational view, partly in section, showing part of the meter casing used for the purpose of the invention.
Figure 2:
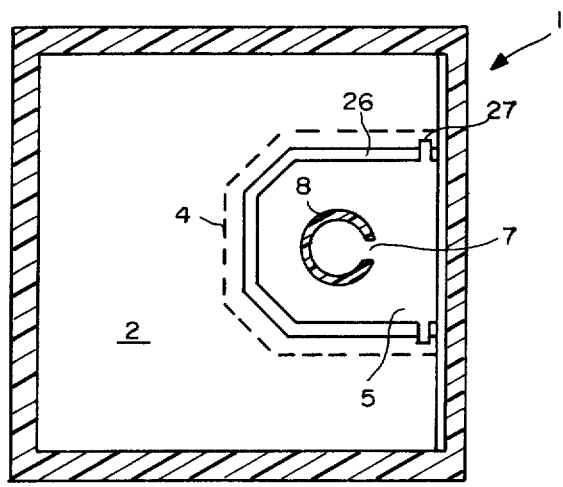
FIG. 2 is a sectional view of the meter casing across A—A of FIG. 1.
Figure 7:
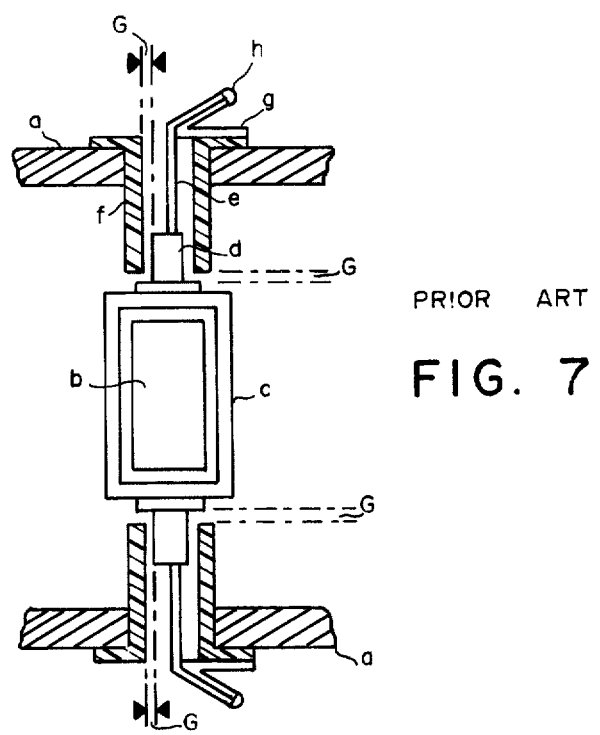
FIG. 7 is a sectional view showing the structure of a conventional taut band suspension mechanism.

Referring to FIGS. 1 and 2, there is shown the structure of a meter casing 1 made, for example, of any suitable plastic material from which casings are normally made. The casing consists essentially of a base 2 and a cover 3, which may be coupled to each other. A cylinder member 4 with a bottom 5 and an open end facing upwardly is disposed integral with the base 2. Meter movement displacement-preventive cylinders 8 and 8' having slits 7 are installed inside the casing, on the bottom 5 and on the underside 6 of the cover 3 respectively; the cylinders 8 and 8' are structurally integral with the casing body and disposed opposite to each other concentrically. These cylinders take the place of the conventional stopper f in FIG. 7 as will later be described in detail.

Figure 3:
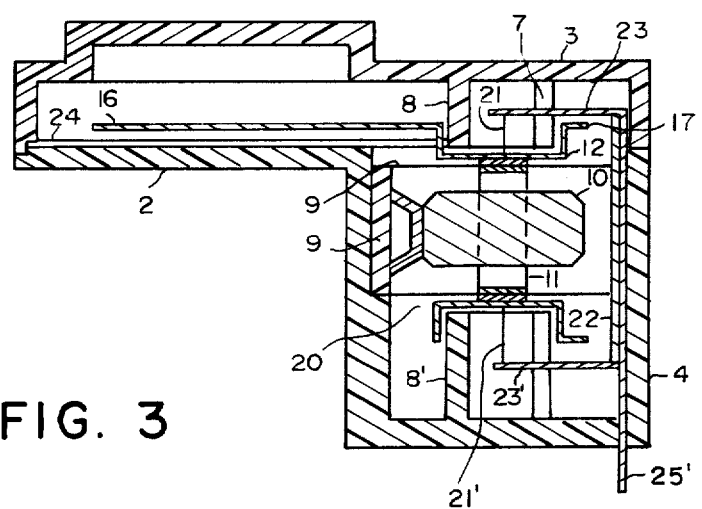
FIGS. 3 and 4 are sectional views showing the meter elements housed in the casing, in connection with the structure shown in FIGS. 1 and 2.
Figure 4:
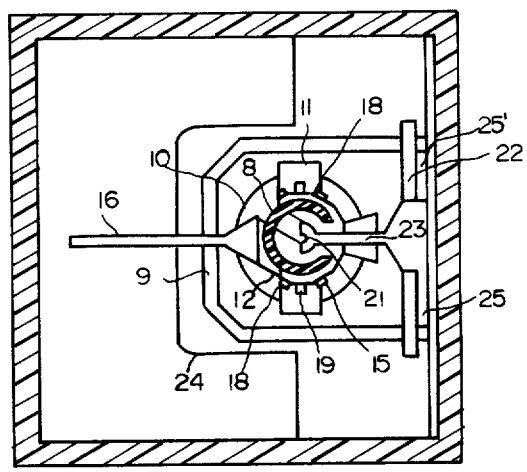

FIGS. 3 and 4 are diagrams showing meter elements assembled and mounted in the casing of the structure shown in FIGS. 1 and 2. In FIGS. 3 and 4, there is shown a U-shaped yoke 9 which can be fitted in the cylinder 4 on the base 2. A magnet 10 is coupled integral with the yoke 9 and carries therewithin a moving coil 11. A taut band supporting plate 12 with a pointer is fastened to one side of the moving coil 11 by way of insulating paper or the like.

Figure 5:
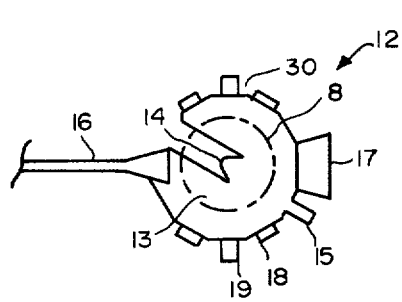
FIG. 5 is a plan view of a taut band suspension plate with a pointer.
Figure 6:
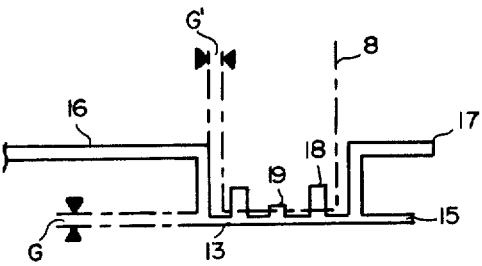
FIG. 6 is an elevational view corresponding to FIG. 5.

The taut band supporting plate 12, as shown in detail in FIGS. 5 and 6, comprises a taut band supporting member 14 disposed in the center part of a base 13 with a part cut out, a taut band fitting arm 15 extended from the base opposite to the supporting member 14, a pointer 16 and a balance arm 17 extended from the base edge, a plurality of small lugs 18 raised from the base edge, and an arm 19 for attachment to a terminal coil lead. The small lugs 18, the pointer support arm, and the balance arm 17 are disposed on a circumference centering the taut band suspension member 14, thus constituting a displacement preventive ring 30. This circumference has a diameter slightly larger than the outer diameter of each of the displacement preventive cylinders 8 and 8'.

Another taut band supporting plate 20 is fastened to the lower side (seen on the drawing) of the moving coil 11 by way of insulating paper or the like. This plate 20 is structurally the same as the plate 12 excepting that the plate 20 has no pointer corresponding to pointer 16. The two supporting plates 12 and 20 are attached to the moving coil on both sides by means of the taut band supporting member 14 in concentric relationship. Taut bands 21 and 21' are soldered to the taut band fitting arms 15 of the taut band supporting plates 12 and 20, respectively, and are supported by the taut band supporting member 14.

An insulating plate 22 is fitted to the U-shaped yoke 9 at the open end, and upper and lower leaf springs 23 and 23', as seen in FIG. 3, are attached to the outer surface of the insulating plate 22. These leaf springs are fitted through the slits 7 of the meter movement displacement-preventive cylinders 8 and 8', respectively. Aligned with the center axis of the cylinders, the taut bands 21 and 21' have their ends soldered to the two leaf springs 23 and 23', respectively, maintaining a suitable tension. A scale plate 24 is located beneath the pointer 16. Terminals 25 and 25' lead out of the meter casing through small slots in the cylindrical member 4. These terminals are integral with the leaf springs 23 and 23', respectively.

The meter elements are assembled and mounted in the casing in the following manner. The taut band supporting plate 12 with a pointer, and the other taut band supporting plate 20, between which the taut band is supported, are fastened to the moving coil 11 on both sides, on the upper and lower sides as seen in the drawing, concentrically, by way of insulating paper or the like. The both ends of coil lead are soldered to the arms 19 of the supporting plates 12 and 20. Then the moving coil is fitted to the magnet 10, and the insulating plate 22 is installed in the yoke 9. The both free ends of the taut band are soldered to the leaf springs 23 and 23', respectively, and thus the moving coil is suspended therein around the magnet. As opposed to the prior art, the device of the invention has no stopper $f$ or similar element and uses the insulating plate 22 in place of the conventional frame $a$, with the result that the process for assembling meter elements is simplified and accurate assembly is realized according to what is designed.

Then, in the next step, the assembled meter movement is fitted in the cylindrical member 4 of the base casing 2 which is equipped with the scale plate 24. Because the meter-moving-elements, the insulating plate, and the yoke are assembled into a unit, these components can be closely fitted in the cylindrical member 4. When the assembled unit is inserted into the cylindrical member 4, the leaf spring 23' passes through the slit 7 of the displacement preventive cylinder 8'.

In this structure, a small gap G is formed between the end of the cylindrical member 4 and the base of the taut band supporting plate 20, and also another small gap G' between the small lug of the supporting plate and the circumference of the cylindrical member 4, as shown in FIG. 6. For accurate positioning to set these gaps, a stepped portion 26 is disposed to control the positioning of the yoke 9. In addition, grooves 27 may be disposed to guide the insulating pplate 22.

Then the cover 1 is fitted on the base casing 2 whereby the leaf spring 23 passes through the slit 7 of the displacement preventive cylinder 8 provided integral with the cover 1. As the result of this process, small gaps G and G' are also formed. Thus a complete mechanism for preventing the displacement of the meter moving-element assembly is realized in the structure comprising the cylinders 8 and 8', the taut band supporting plate 12 with a pointer, and the other taut band supporting plate 20. The invention has been described in connection with an indicating meter of internal magnetic type. Clearly, the invention is applicable to an indicating meter of external magnetic type.

The device of the invention, as has been described in detail, has in place of the conventional stopper $f$, a set of components installed integral with the meter casing and thus permitting reduction in the number of meter elements. Furthermore, taut band supporting plates are used instead of the conventional boss $d$, which plates can be accurately manufactured according to design, thus enabling the assembly of elements to be simplified without lowering the assembling accuracy. These features of the invention will no doubt contribute a great deal to the achievement of a complete mechanism for preventing the displacement of the meter movement as opposed to the prior art arrangement. The invention is particularly useful when applied to small-size indicating meters manufactured on a mass production basis.

Although a specific embodiment of the invention has been disclosed herein in detail, it is to be understood that this is for the purpose of illustrating the invention, and should not be construed as necessarily limiting the scope of the invention, since it is apparent that many changes may be made to the disclosed structure by those skilled in the art to suit particular applications.

What is claimed:

1. In an electrical indicating instrument of the type comprising a casing for holding said instrument therein, a magnet, a moving coil, and a taut metal band serving as the rotating axis of the moving coil located in the magnetic field of the magnet, the taut band being suspended between support members, the improvement for providing a vibration-resistant device, wherein said casing comprises a lower cylindrical portion, an intermediate base portion and a cover, and wherein said instrument further includes moving coil displacement preventive rings disposed concentrically with the rotating axis on both sides of the moving coil, and moving coil displacement preventive cylinders within the casing and integral thereto and opposite to each other and closely adjacent to the moving coil displacement preventive rings on both sides, each of said rings having a planar portion with elements projecting from the periphery of said planar portion to provide a cup-like configuration, said coil displacement preventive cylinders projecting into said cup-like configurations, one of said coil displacement preventive cylinders being integral with said cover and the other being integral with the bottom of said cylindrical portion of said casing.

* * * * *